(12) United States Patent
Walters

(10) Patent No.: US 9,897,466 B2
(45) Date of Patent: Feb. 20, 2018

(54) ROTOR POSITION SENSOR SIGNAL CORRECTION

(71) Applicant: DELPHI TECHNOLOGIES, INC., Troy, MI (US)

(72) Inventor: James E. Walters, Carmel, IN (US)

(73) Assignee: DELPHI TECHNOLOGIES, INC., Troy, MI (US)

(*) Notice: Subject to any disclaimer, the term of this patent is extended or adjusted under 35 U.S.C. 154(b) by 0 days.

(21) Appl. No.: 15/212,573

(22) Filed: Jul. 18, 2016

(65) Prior Publication Data
US 2018/0017413 A1     Jan. 18, 2018

(51) Int. Cl.
*G01B 7/30*     (2006.01)
*G01D 5/20*     (2006.01)

(52) U.S. Cl.
CPC ........................... *G01D 5/20* (2013.01)

(58) Field of Classification Search
CPC ........................................................ G01B 7/30
USPC ..................................................... 324/207.25
See application file for complete search history.

(56) References Cited

U.S. PATENT DOCUMENTS

| | | |
|---|---|---|
| 4,463,299 A | 7/1984 | Langley et al. |
| 5,334,923 A | 8/1994 | Lorenz et al. |
| 7,126,495 B2 | 10/2006 | Netzer |

FOREIGN PATENT DOCUMENTS

DE    10 2013 201 234 A1    7/2014

OTHER PUBLICATIONS

Christer Ebbesson.: "Rotary Position Sensors Comparative Study of Different Rotary Position Sensors for Electrical Machines Used in an Hybrid Electric Vehicle Application", Christer Ebbeson, Faculty of Engineering, Lund University, Lund, Sweden, christer.ebbsson@gmail.com, Aug. 29, 2011.
Lara, et al. "A Novel Algorithm Based on Polynomial Approximations for an Efficient Error Compensation of Magnetic Analog Encoders in PMSMs for EVs", IEEE Transactions on Industrial Electronics, Jun. 2016, pp. 3377-3388, vol. 63, No. 6.
European Search Report for related EP Application No. 17180596.3—1806; dated: Dec. 8, 2017; 6 pages.

*Primary Examiner* — Bot Ledynh
(74) *Attorney, Agent, or Firm* — Joshua M. Haines

(57) ABSTRACT

A motor control system includes a shaft configured to be rotationally driven by a motor. A rotor position sensor is configured to detect rotation of the shaft and output a rotor position signal. A controller is in communication with the motor and the rotor position sensor. The controller converts the rotor position signal to an angle with error, tracks the angle with error to provide an angle that retains mechanical dynamics as stationary reference frame signals, transforms the stationary reference frame signals and the angle with mechanical dynamics to rotating reference frame signals, filters the rotating reference frame signals, transforms the filtered rotating reference frame signals to provide filtered stationary frame signals, and takes an arctangent of the filtered stationary reference frame signals to create a corrected motor control angle. The controller commands the motor based upon the corrected motor control angle.

16 Claims, 5 Drawing Sheets

ROTOR POSITION SENSOR SIGNAL CORRECTION

BACKGROUND

This disclosure relates to a method of correcting a rotor position sensor signal. The disclosure also relates to a motor control system that utilizes this method, which may be incorporated into a hybrid vehicle.

Electric drive vehicles use electric motors to apply torque to an engine, a driveline, and/or wheels of the vehicle. High efficiency, accurate torque control and functional safety requirements necessitate the use of a position sensor. While resolvers have been historically used for such tasks, an inductive position sensor can be used, which provides sin(θ) and cos(θ) waveforms ("sine and cosine signals"), where θ is the angle of the rotor relative to the stator. Generally speaking, the arctangent operation can be taken to extract the underlying angle. For ideal signals, this will work correctly. Due to manufacturing tolerances in the rotor position sensor's target trace, air gap variation and underlying sensor tolerances, the rotor position sensor sine and cosine signals contain numerous error effects. Such errors can lead to poor position determination and ultimately inaccurate and inefficient motor control.

Existing approaches for improving the angular information from the sensor often require correcting the angle resulting from the processing of the sine and cosine signals, which can be problematic as the errors of the rotor position sensor system are often spectrally close to the desired θ signal. If the error is at known frequencies, then these specific effects can be removed. But, if the effect has a broad spectral content, then it can be extremely challenging to recover the desired rotor position information when removing the error. Furthermore, the overlapping of the θ spectral content and error spectral content can be a function of rotational frequency.

In general, if too much filtering or noise removal is performed, frequency content of θ related to real effects such as acceleration can be lost leading to poor machine control or even precluding the ability to control a machine. Filters or observers can be used but the tradeoff of attempting to track the dynamics of interest while still removing the error is extremely challenging. The challenge is that sufficient position and speed dynamics have to be tracked to keep accurate control of the machine while still removing the error effects that degrade performance.

SUMMARY

In one exemplary embodiment, a method of controlling a motor by determining an absolute angular position includes the steps of converting a rotor position signal to an angle with error and tracking the angle with error to provide an angle that retains mechanical dynamics as stationary reference frame signals. The stationary reference frame signals and the angle with mechanical dynamics are transformed to rotating reference frame signals. The rotating reference frame signals are filtered and the filtered rotating reference frame signals are transformed to provide filtered stationary frame signals. An arctangent of the filtered stationary reference frame signals is taken to create a corrected motor control angle.

In a further embodiment of the above, the rotatory position signal includes sine and cosine signals.

In a further embodiment of any of the above, an induction position sensor is configured to produce the sine and cosine signals indicative of an angular position of a rotating shaft.

In a further embodiment of any of the above, an electric motor is in communication with a controller. The controller is configured to provide a torque command to the electric motor by modulating a voltage to the electric motor with an inverter based upon the corrected motor control angle.

In a further embodiment of any of the above, the angle with error tracking step includes retaining acceleration data associated with the rotor position signal.

In a further embodiment of any of the above, the angle with error tracking step includes applying a speed state filter to the angle with error.

In a further embodiment of any of the above, the speed state filter provides a frequency and angle containing the mechanical dynamics.

In a further embodiment of any of the above, the rotating reference frame signals filtering step includes applying a low pass filter to the rotating reference frame signals.

In a further embodiment of any of the above, the corrected motor control angle includes an error of less than ±0.3°.

In another exemplary embodiment, a motor control system includes a motor and a shaft that is configured to be rotationally driven by the motor. A rotor position sensor is configured to detect rotation of the shaft and output a rotor position signal. A controller is in communication with the motor and the rotor position sensor. The controller is configured to convert the rotor position signal to an angle with error and track the angle with error to provide an angle that retains mechanical dynamics as stationary reference frame signals. The stationary reference frame signals and the angle with mechanical dynamics is transformed to rotating reference frame signals. The rotating reference frame signals are filtered and the filtered rotating reference frame signals are transformed to provide filtered stationary frame signals and an arctangent of the filtered stationary reference frame signals is taken to create a corrected motor control angle. The controller is configured to command the motor based upon the corrected motor control angle.

In a further embodiment of any of the above, the rotatory position signal includes sine and cosine signals.

In a further embodiment of any of the above, an induction position sensor is configured to produce the sine and cosine signals indicative of an angular position of the shaft.

In a further embodiment of any of the above, the angle with error tracking step includes retaining acceleration data associated with the rotor position signal.

In a further embodiment of any of the above, the angle with error tracking step includes applying a speed state filter to the angle with error.

In a further embodiment of any of the above, the speed state filter provides a frequency and angle containing the mechanical dynamics.

In a further embodiment of any of the above, the rotating reference frame signals filtering step includes applying a low pass filter to the rotating reference frame signals.

In a further embodiment of any of the above, the corrected motor control angle includes an error of less than ±0.3°.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
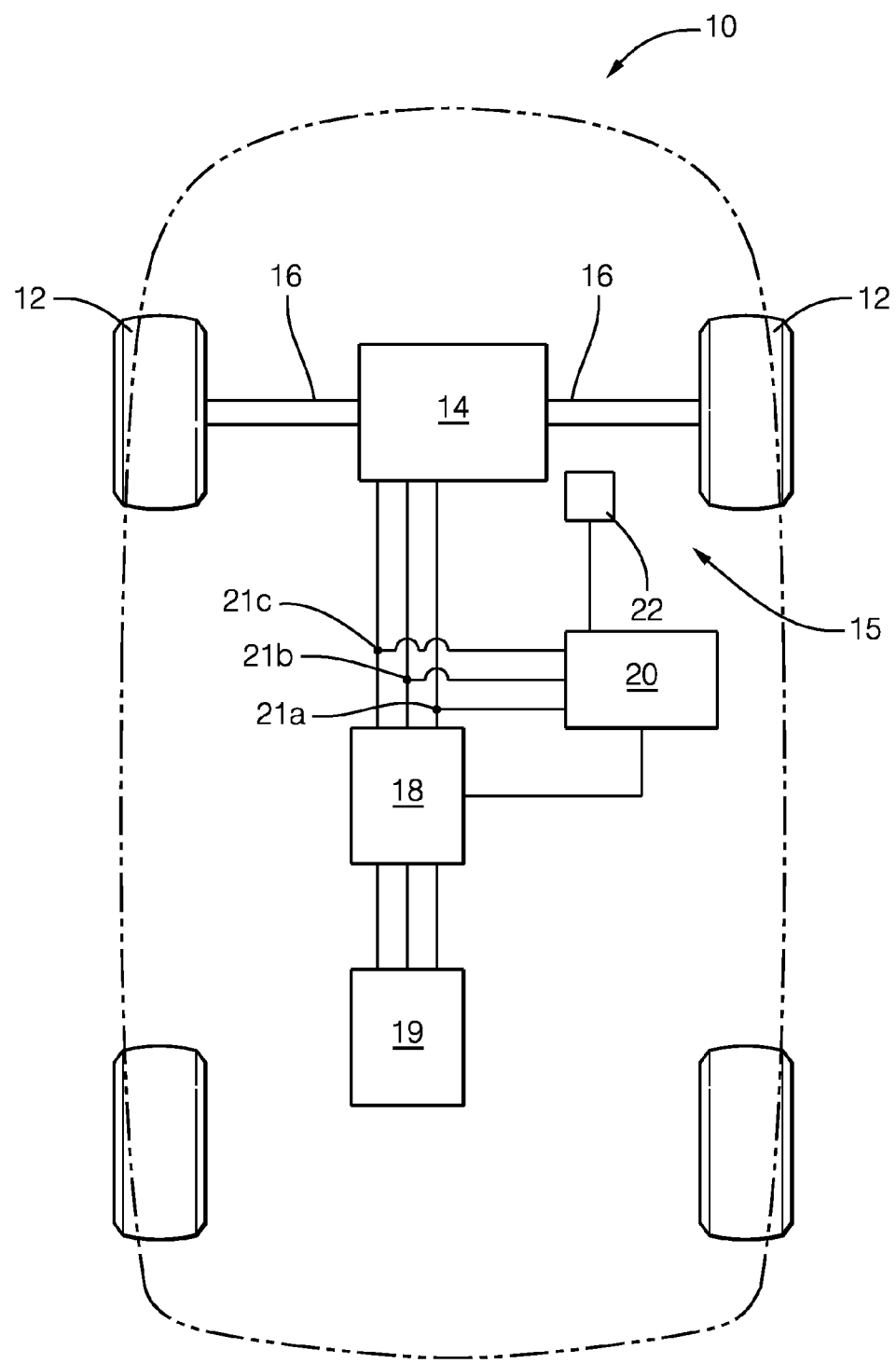
FIG. 1 is a schematic view of a vehicle with an electric motor, a rotor position sensor and a controller.

An electric/hybrid vehicle 10 is schematically shown in FIG. 1, the vehicle 10 includes an electric motor 14 that drives wheels 12 via shafts 16. The motor 14 receives power from a power electronics device 18, typically an inverter, which is powered by an energy source such as a battery 19. The motor 14 also may also act as a generator to charge the power source 19 through inverter 18. The vehicle 10 is for exemplary purposes only and is in no way intended to limit the scope of the invention disclosed herein.

A motor control system 15 includes a rotor position sensor 22 that is configured to detect rotation of one of the shafts 14 and output a rotor position signal, which inherently includes undesirable error effects. One type of suitable rotor position sensor is an inductive sensor, such as a Sumida-style rotor position sensor that outputs sine and cosine waveforms. It should be noted that other types of sensors may be used, such as rotor sensors that output demodulated resolver signals in the form of sine and cosine waveforms from which an absolute angular position may be determined. Such rotor positions sensors are disclosed in Christer Ebbesson, *Rotary Position Sensors Comparative Study of Different Rotary Position Sensors for Electrical Machines Used in an Hybrid Electric Vehicle Application* (Aug. 29, 2011) (unpublished M.sC. thesis, Lund University), available at http://lup.lub.lu.se/student-papers/search/publication/3632648, which is incorporated by reference herein in its entirety.

A controller 20 is in communication with the inverter 18, current sensors 21a, 21b, 21c and the rotor position sensor 22. The controller 20 can be a single processor, or may comprise multiple processors distributed throughout the vehicle 10. The controller 20 uses a signal processing method on the position signal that preserves only the content sufficiently close to the signal of interest. That is, rather than simply taking the arctangent of the raw sine and cosine outputs of the rotor position sensor, the base sine and cosine signals are refined to remove the error effects while retaining the desired mechanical dynamic content. The controller 20 also receives signals from the current sensors 21a, 21b, 21c that provide a measurement of the current in each of the phases of the motor. By using control techniques, such as vector control, the phase current and the corrected position sensor information are used to control the current to the commanded value by determining what voltage should be applied by inverter 18 to motor 14. By applying voltage, the controller 20 can control the current in the machine and ultimately the torque on the shaft of motor 14.

Figure 2:
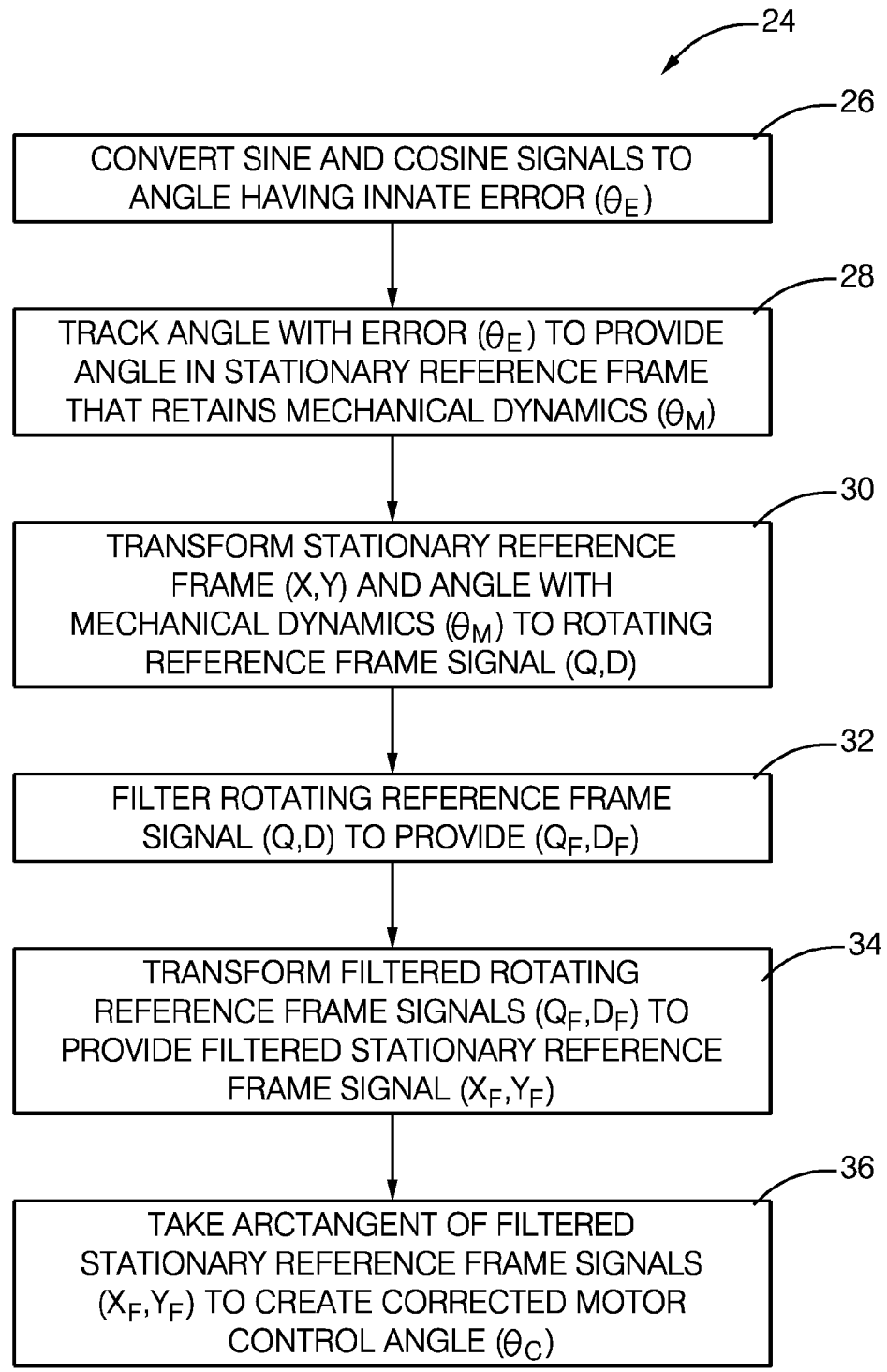
FIG. 2 is a flow chart depicting a method of determining an absolute angular position for controlling the electric motor.

The processing method 24 used by the controller 20 is illustrated in a flow chart shown in FIG. 2. The controller 20 converts the rotor position signal, with sine and cosine components, to an angle with error $\theta_E$ (block 26). The angle with error $\theta_E$ is tracked with a state filter in order to provide an angle $\theta_M$ that retains mechanical dynamics in a stationary reference frame (block 28). It should be noted that the actual angle may have significant phase differences or even dynamic low frequency differences relative to the actual rotor angle as the goal is to create angular information that sufficiently tracks the dynamics of the shaft in order to define a reference frame and not an exact angle for control. The controller 20 transforms the stationary reference frame X, Y and the angle with mechanical dynamics $\theta_M$ to rotating reference frame signals Q, D (block 30) according to Equation 1 below.

$$\begin{pmatrix} Q \\ D \end{pmatrix} = \begin{pmatrix} \cos\theta_M & -\sin\theta_M \\ \sin\theta_M & \cos\theta_M \end{pmatrix} \cdot \begin{pmatrix} X \\ Y \end{pmatrix}. \quad \text{Equation 1}$$

In this rotating reference frame, the inputs X, $\cos(\theta)$ and Y, $\sin(\theta)$ now become quantities near DC.

The controller 20 then filters the rotating reference frame signals X, Y to provide filtered rotating reference frame signals $Q_F$, $D_F$ (block 32). In this case, a fixed order low pass filter can be used across the entire speed range as the signals content of interest is near DC. The filtered rotating reference frame signals $Q_F$, $D_F$ are transformed back to a stationary reference frame to provide filtered stationary frame signals $X_F$, $Y_F$ (block 34) according to Equation 2 below.

$$\begin{pmatrix} X_F \\ Y_F \end{pmatrix} = \begin{pmatrix} \cos\theta_M & \sin\theta_M \\ -\sin\theta_M & \cos\theta_M \end{pmatrix} \cdot \begin{pmatrix} Q_F \\ D_F \end{pmatrix}. \quad \text{Equation 2}$$

Filtered stationary frame signals $X_F$, $Y_F$ are now filtered RPS $\cos(\theta)$ and $\sin(\theta)$ signals with the various error effects reduced due to the filtering Transforming signals between rotating and stationary reference frames is explained in, for example, Novotny, D. W., and T. A. Lipo. *Vector Control and Dynamics of AC Drives*. Oxford: Clarendon, 1996. Print, which is incorporated by reference herein in its entirety.

An arctangent of the filtered stationary reference frame signals $X_F$, $Y_F$ is taken to create a corrected motor control angle $\theta_C$ (block 36). The controller 20 commands the motor 14 based upon this corrected motor control angle $\theta_C$, which represents an accurate absolute angular position.

Figure 3:
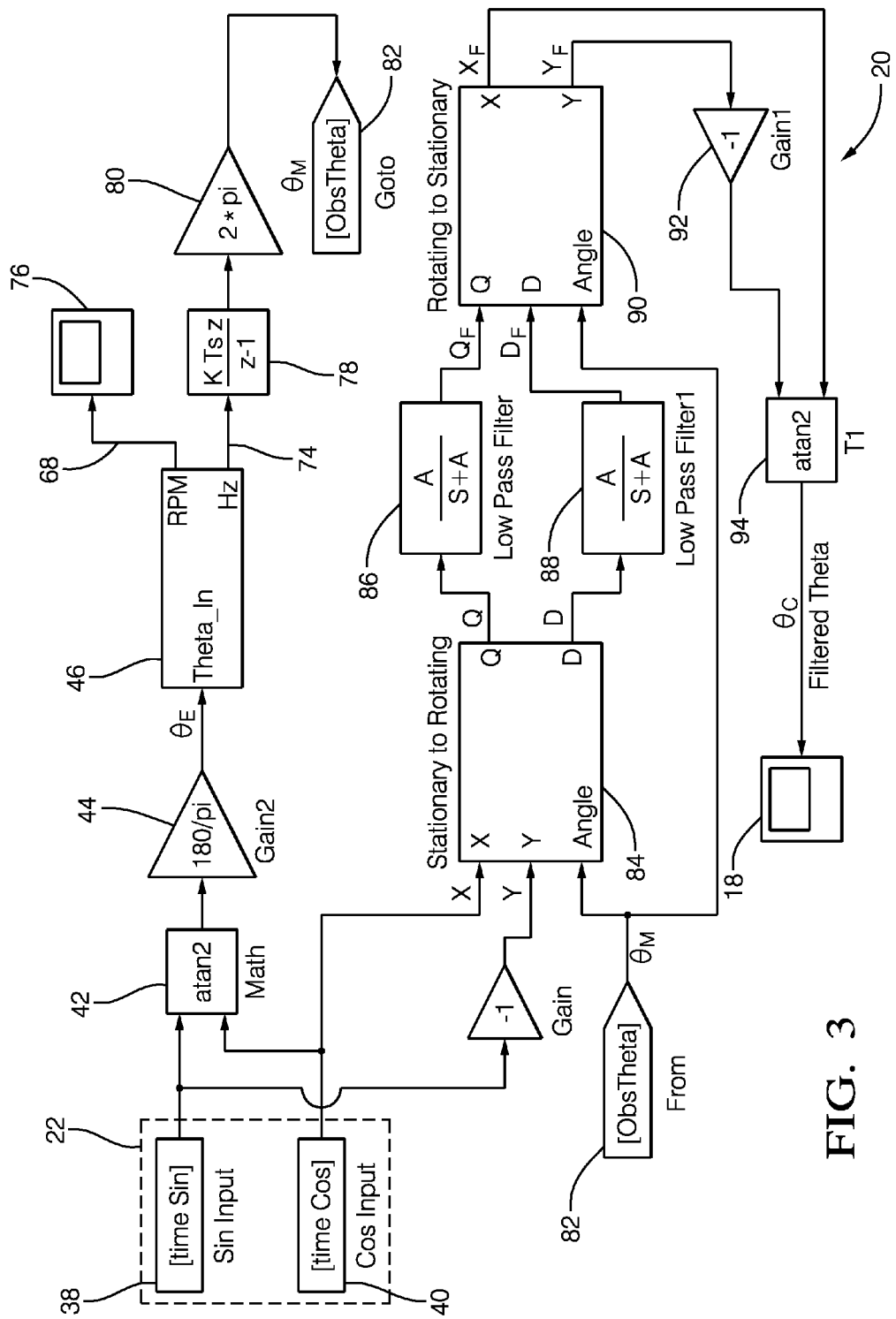
FIG. 3 is a control diagram illustrating processing of a rotor position sensor to produce a corrected motor control angle.

Referring to FIG. 3, a control diagram is shown that processes the rotor position sensor to produce the corrected motor control angle. It should be understood that variations to the control diagram can be used and still fall within the scope of the claims.

The rotor position sensor 22 generates a rotor position signal comprising sine and cosine signals 38, 40. An arctangent of the sine and cosine signals 38, 40 is taken at 42 to produce an angle that is multiplied at 44 to convert the angle from radians to degrees and provide an angle with error $\theta_E$. It should be noted that the error effectively repeats each mechanical cycle but the actual error pattern is dependent upon speed and temperature (due to thermal growth impacting the airgap). For a motor control drive, this error content is significant and will impact torque control especially at high speed. Generally speaking, error of less than ±0.3° is desired and an error of less than ±0.2° is more desirable.

Correcting the resultant angle $\theta_E$ is difficult. The underlying sine and cosine waveforms need to be corrected before the angle used for motor control is determined. Specifically, if the base fundamental frequency (tied to the rotational speed) and a band of frequencies (with rotational dynamic frequencies associated with acceleration events) can be maintained, then the base sine and cosine signals can be significantly improved. This can be challenging as the frequencies related to acceleration tend to exist below 100 Hz, but the fundamental frequency can be as high as 1300 Hz.

Figure 4:
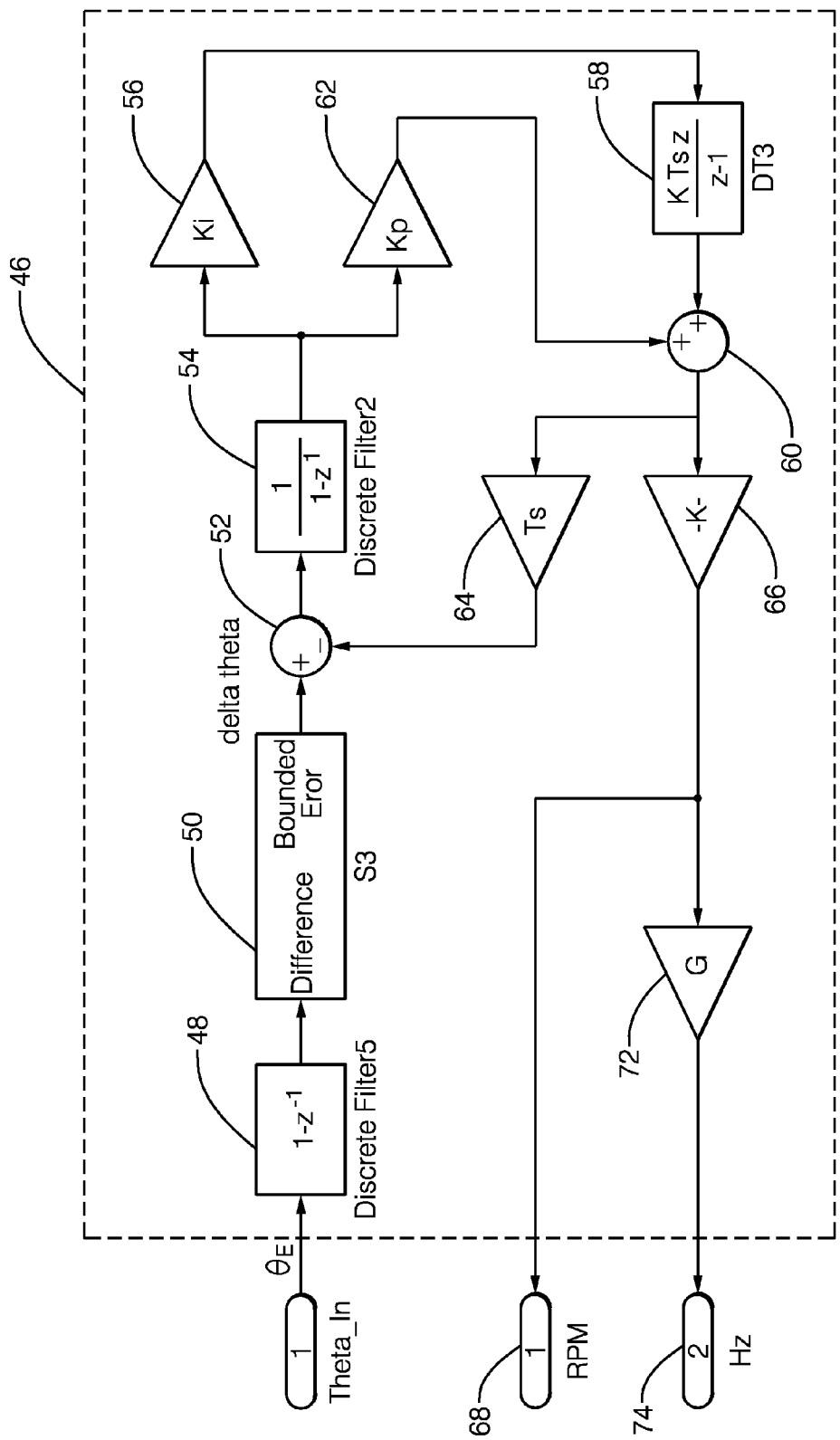
FIG. 4 is a control diagram illustrating an example filter shown in the control diagram of FIG. 3.

A speed state filter 46, shown in more detail in FIG. 4, is generally set to track the dynamics of the mechanical acceleration and provide an angle that retains mechanical dynamics $\theta_M$. The state filter 46 is shown in an incremental format which precludes large values from being integrated but a non-incremental format can be used alternatively. A Δθ is calculated at 48 and 50. The estimated Δθ from block 64 is subtracted from Δθ at junction 52 and this error of Δθ is integrated at 54. The integrated Δθ error is multiplied by an integral gain 56 and then is proportionally integrated at 58. The integrated value from 58 is summed at 60 with the integrated Δθ error at 54 after being multiplied by a proportional gain 62. The summed value from 60 is multiplied by a gain 64, which is subtracted from the Δθ at junction 52. The summed value from 60 is converted from degrees/sec by a scaling factor 66 to provide the speed in RPM at 68. This summed value from 60 is also multiplied by a scaling factor at 72 to provide the frequency at 74 in Hertz.

Returning to FIG. 3, the frequency at 74 is proportionally integrated at 78 and multiplied by a factor 80 to convert the frequency to an angle $\theta_M$ that retains the mechanical dynamics of the rotor position signal. Unfortunately, the resulting angle $\theta_M$ does not sufficiently track the position signals to be used by a motor control system. If the bandwidth is lowered too much then the actual angular content due to real effects such as acceleration will not be tracked and loss of machine control can result. If an angle is formed from this speed, the position error will be too significant for accurate torque control. For a filter with too high of a bandwidth, the sensor error effects on the angle will be tracked. For too low of a bandwidth, the actual angle will not track and will result in loss of machine control.

If a stationary reference frame is used that dynamically tracks the error effects, such as would occur if the angle derived from the arctangent operation 42 is used, the underlying error effects would be passed directly into the resultant signals since the stationary reference frame has the error. Instead, a lower bandwidth signal is required that tracks the mechanical dynamics but not the error effects. It should be noted that this type of angle signal would be completely unusable for machine control. Said another way, while the frequency is sufficiently close (within a few Hz), the actual angle can differ in phase considerably from the true angle.

The information contained in sine and cosine signals 38, 40 do not have to be viewed strictly in an AC sense. It is possible to define a reference frame that is rotating and process the rotating reference frame signals. In this rotating reference frame, content that is near DC will represent the signal associated with the fundamental sine and cosine waveforms, which conveys the angular information. Thus, low pass filtering can be used to remove error effects not associated with mechanical dynamics. If the rotating reference frame captures the dynamics associated with the shaft acceleration then the fundamental problem of maintaining tracking with acceleration and removing additional error content can be addressed. However, the rotating reference frame angle should not contain any significant degree of the error effects that are desired to be removed.

If the spectrally limited angle $\theta_M$ is used for the transformation angle then the sine and cosine signals 38, 40 containing the error effects can be rotated into rotating reference frame. While the resultant signal may not be exactly DC the content of interest will be sufficiently close to DC so that these signals can be filtered with basic first order low pass filters to remove error content and then rotated back to the dynamic, stationary reference frame resulting in substantially improved sine and cosine signals that can now be input to an arctangent operation to form an angle suitable for machine control.

The angle $\theta_M$ can be used to define a rotating reference frame. The cosine signal 38 is provided to a block 84 as a signal X along with a signal Y, which is the sine signal 40 multiplied by a gain 83. Block 84 transforms the stationary reference frame signals X, Y and the angle $\theta_M$ with mechanical dynamics to rotating reference frame signals Q, D. These rotating reference frame signals Q, D can be filtered by low pass filters 86, 88 to produce filtered rotating reference frame signals $Q_F$, $D_F$, where A is the bandwidth of the low pass filter in rad/sec and S is the LaPlace operation.

The filtered rotating reference frame signals $Q_F$, $D_F$ are transformed again at block 90 to provide filtered stationary frame signals $X_F$, $Y_F$, which are now sine and cosine signals with substantial error reduction. A gain 92 is applied to the signal $Y_F$ and the arctangent is taken of that product and $X_F$ at 94 to create a corrected motor control angle $\theta_C$. The controller 20 then commands the motor 14, in the example, via the inverter 18, based upon the corrected motor control angle $\theta_C$.

Figure 5:
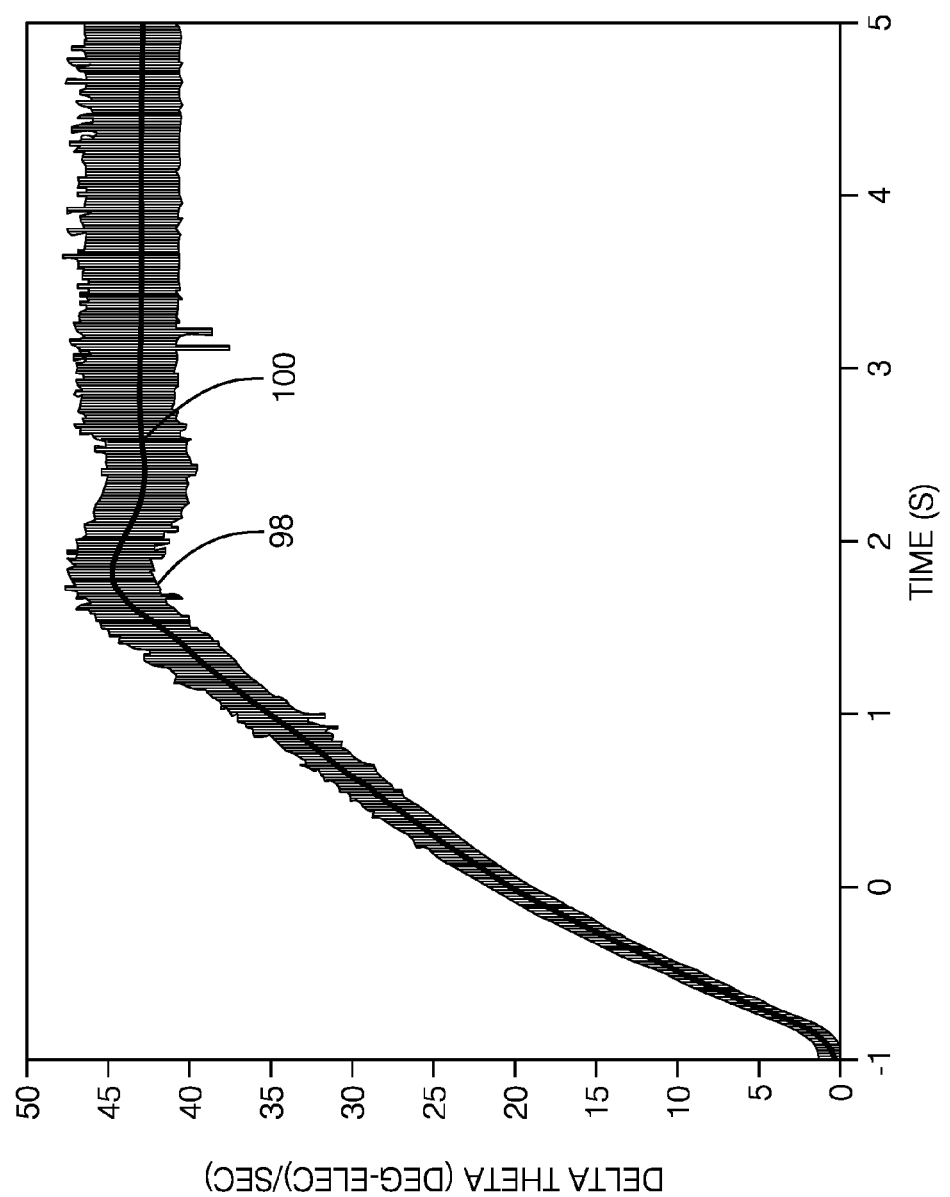
FIG. 5 is a graph depicting the corrected rotor motor control angle to an uncorrected motor control angle.

The disclosed method and system where tested by spinning the electric motor 14 and rotary position sensor 22 on a dynamometer from 0 to 4500 RPM at a rate of 3000 RPM/sec. Using this test, a comparison is shown in FIG. 5 between the corrected motor control angle $\theta_C$ and the uncorrected motor control angle that would result without the use of the disclosed method. The darker lines in the graph correspond to the Δθ from the arctangent of the raw, uncorrected sine and cosine signals. The lighter lines are the Δθ from the arctangent of the transformed and filtered signals according to the disclosed method. From the graph, it is clear that the dynamics associated with the 0 to 4500 RPM transient were maintained. In addition, the actual overshoot of speed on the dynamometer is clearly tracked. It is also evident that considerable error has been removed.

At 4500 RPM, one mechanical cycle occurs every 13.333 ms. At 4500 RPM and 100 μs sampling with a 16 pole pair machine (as used in this test), the expected Δθ would be a constant value of 43.2°/sec. The uncorrected rotor position signal shown by the darker lines clearly contains large error content. The corrected motor control signal, shown by the lighter lines, by contrast has removed the error. Furthermore, the target of reducing the error to ±0.3° is also achieved. The testing was also performed with acceleration rates consistent with a motor mounted to a drive shaft.

The controller 20 may include a processor and non-transitory memory where computer readable code for controlling operation is stored. In terms of hardware architecture, such a controller can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 20 may be a hardware device for executing software, particularly software stored in memory. The processor can be a custom made or commercially available processor, a central processing unit (CPU), an auxiliary processor among several processors associated with the controller, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, etc.). Moreover, the memory may incorporate electronic, magnetic, optical, and/or other types of storage media. The memory can also have a distributed architecture, where various components are situated remotely from one another, but can be accessed by the controller.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The input/output devices that may be coupled to system I/O Interface(s) may include input devices, for example, but not limited to, a scanner, microphone, camera, proximity device, etc. Further, the input/output devices may also include output devices, for example but not limited to a display, etc. Finally, the input/output devices may further include devices that communicate both as inputs and outputs, for instance but not limited to, a modulator/demodulator (for accessing another device, system, or network), a radio frequency (RF) or other transceiver, a bridge, a router, etc.

When the controller 20 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method controlling a motor by determining an absolute angular position, the method comprising the steps of:
    providing an induction position sensor that is configured to produce a rotor position signal based on sine and cosine signals indicative of an angular position of a rotating shaft;
    converting the rotor position signal to an angle with error;
    tracking the angle with error to provide an angle that retains mechanical dynamics as stationary reference frame signals;
    transforming the stationary reference frame signals and the angle with mechanical dynamics to rotating reference frame signals;
    filtering the rotating reference frame signals;
    transforming the filtered rotating reference frame signals to provide filtered stationary frame signals; and
    taking an arctangent of the filtered stationary reference frame signals to create a corrected motor control angle.

2. The method according to claim 1, wherein the rotatory position signal includes sine and cosine signals.

3. The method according to claim 1, comprising an electric motor in communication with a controller, the controller configured to provide a torque command to the electric motor by modulating a voltage to the electric motor with an inverter based upon the corrected motor control angle.

4. The method according to claim 1, wherein the angle with error tracking step includes retaining acceleration data associated with the rotor position signal.

5. The method according to claim 4, wherein the angle with error tracking step includes applying a speed state filter to the angle with error.

6. The method according to claim 5, wherein the speed state filter provides a frequency containing the angle with mechanical dynamics.

7. The method according to claim 1, wherein the rotating reference frame signals filtering step includes applying a low pass filter to the rotating reference frame signals.

8. The method according to claim 1, wherein the corrected motor control angle includes an error of less than ±0.3°.

9. A motor control system comprising:
    a motor;
    a shaft configured to be rotationally driven by the motor;
    a rotor position sensor configured to detect rotation of the shaft and output a rotor position signal; and
    a controller in communication with the motor and the rotor position sensor, the controller configured to convert the rotor position signal to an angle with error, track the angle with error to provide an angle that retains mechanical dynamics as stationary reference frame signals, transform the stationary reference frame signals and the angle with mechanical dynamics to rotating reference frame signals, filter the rotating reference frame signals, transform the filtered rotating reference frame signals to provide filtered stationary frame signals, and take an arctangent of the filtered stationary reference frame signals to create a corrected motor control angle, the controller configured to command the motor based upon the corrected motor control angle.

10. The system according to claim 9, wherein the rotatory position signal includes sine and cosine signals.

11. The system according to claim 10, comprising an induction position sensor that is configured to produce the sine and cosine signals indicative of an angular position of the shaft.

12. The system according to claim 9, wherein the angle with error tracking step includes retaining acceleration data associated with the rotor position signal.

13. The system according to claim 12, wherein the angle with error tracking step includes applying a speed state filter to the angle with error.

14. The system according to claim 13, wherein the speed state filter provides a frequency containing the angle with mechanical dynamics.

15. The system according to claim 9, wherein the rotating reference frame signals filtering step includes applying a low pass filter to the rotating reference frame signals.

16. The system according to claim 9, wherein the corrected motor control angle includes an error of less than ±0.3°.

* * * * *